Nov. 8, 1949      O. MUELLER      2,487,262
FORCE APPLYING TOOL
Filed April 2, 1945      4 Sheets-Sheet 1
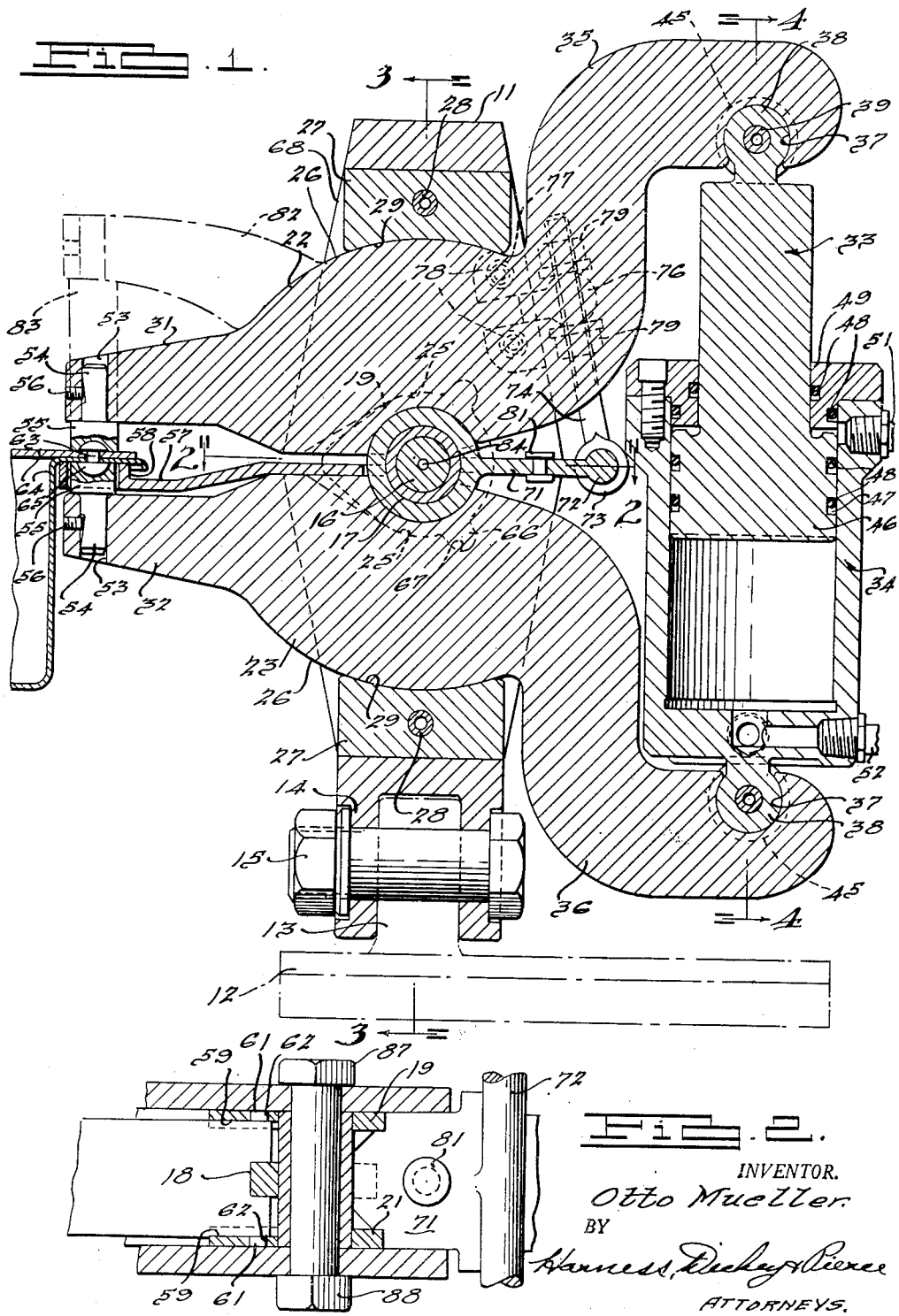
INVENTOR.
Otto Mueller.
BY
Harness, Dickey & Pierce
ATTORNEYS.

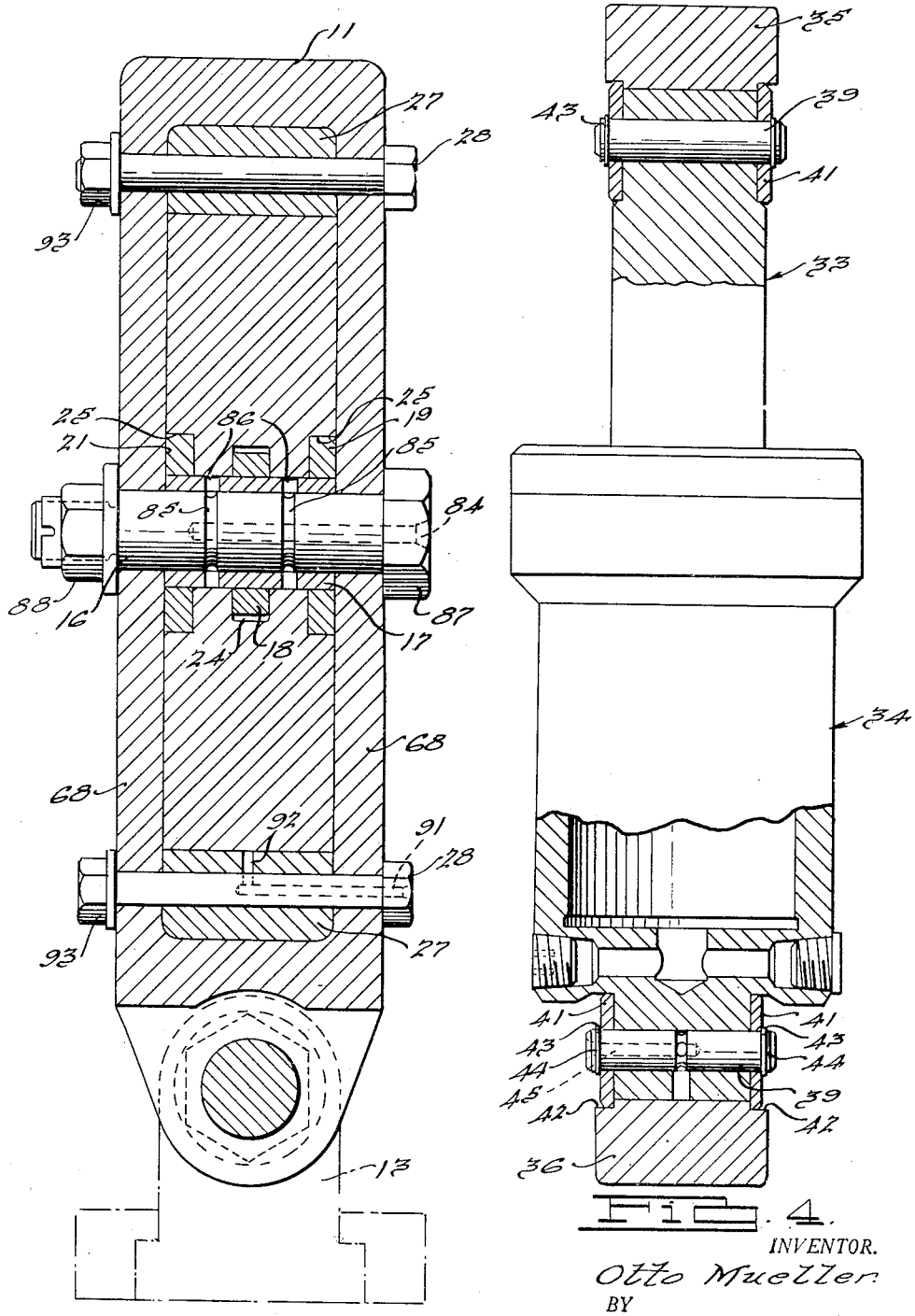

Nov. 8, 1949     O. MUELLER     2,487,262
FORCE APPLYING TOOL
Filed April 2, 1945     4 Sheets-Sheet 3
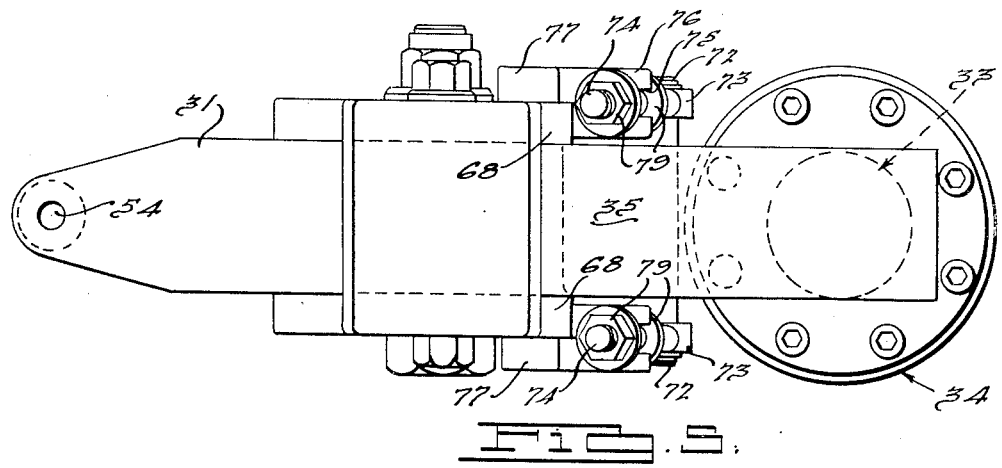
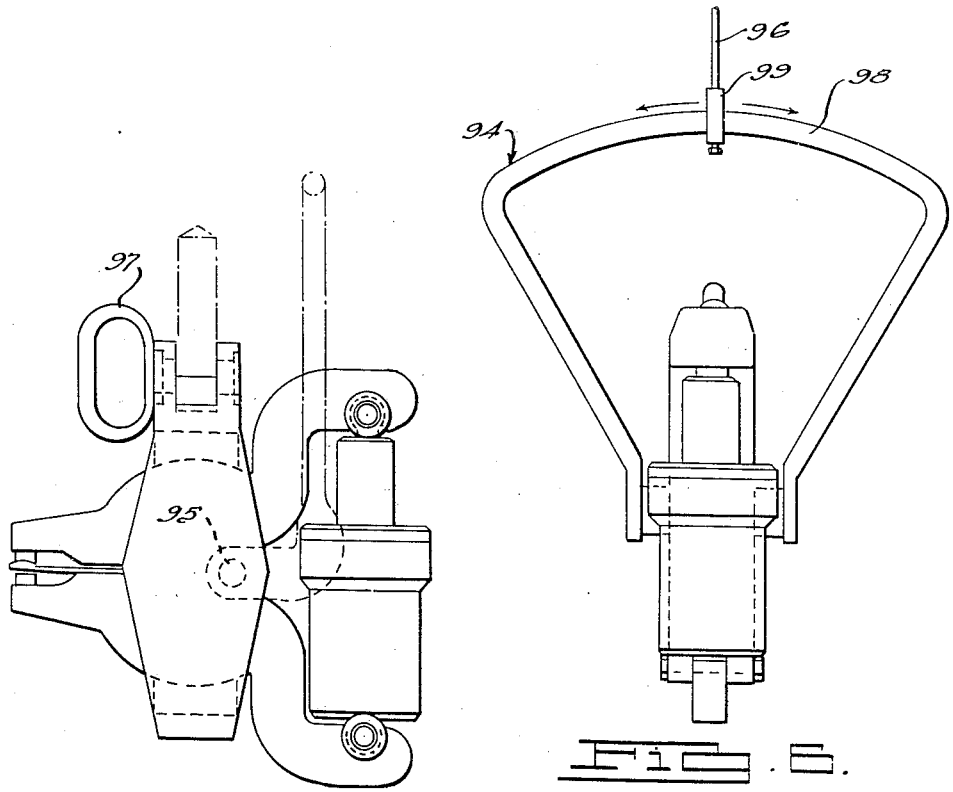
INVENTOR.
Otto Mueller.
BY
Harness, Dickey & Pierce
ATTORNEYS.

Nov. 8, 1949

O. MUELLER 2,487,262

FORCE APPLYING TOOL

Filed April 2, 1945

INVENTOR.
Otto Mueller.
BY
Harness, Dickey & Pierce.
ATTORNEYS.

Patented Nov. 8, 1949

2,487,262

UNITED STATES PATENT OFFICE 2,487,262

FORCE APPLYING TOOL

Otto Mueller, Dearborn, Mich.

Application April 2, 1945, Serial No. 586,179

4 Claims. (Cl. 78—48)

This invention relates to pressure applying devices, and particularly to a fluid actuated jaw device for applying pressure for performing riveting, welding, and like operations.

It has been the practice heretofore in the art to utilize fluid pressure means for performing riveting and welding operations. Such devices usually applied the force directly from the piston to the work which required the cylinder to be mounted above the work which at times limited the application of the device because of interference. When the piston and cylinder were offset from the work, the mechanical efficiency was usually lowered, which often times resulted in defective work being performed.

The present invention embodies a pair of cradled jaws operated by a piston and cylinder remote from the ends which perform the operation upon the work. When the jaws are the same distance from their center of operation as the piston, the same mechanical advantage obtains. This may be increased or decreased by changing the relative position of the piston and cylinder and the work engaging portions of the jaws relative to the jaw centers.

A pair of bearings is mounted within a yoke having arcuate surfaces which engage the outer arcuate surfaces of the jaws. The jaws are retained from shifting by a central bearing element upon which the jaws rock. Operating arms extend from one end of the jaws having cylindrical apertures in which cylindrical ends on the piston and cylinder have operating engagement. Through the movement of the piston within the cylinder, the work engaging elements which project from the opposite ends of the jaws are moved into and out of work engaging position. Riveting heads may be mounted in the work engaging portions of the jaw for performing a riveting operation on rivets which extend through the workpieces to be secured together. The jaw portions may be made of conducting material and have welding electrodes attached thereto through which current and cooling fluid are passed to perform a welding operation on workpieces which are to be secured together.

The jaws may be provided with a balancing mechanism which prevents them from freely floating on the bearings within the yoke and which divides the movement produced by the piston and cylinder equally on each of the jaws relative to the yoke. A spring pressure plate may be mounted between the jaws for applying a predetermined pressure between two workpieces to be riveted or welded for maintaining them in engagement with each other under a desired pressure during the performance of the riveting or welding operation thereon. A plurality of the devices may be mounted upon fixtures to perform a number of operations simultaneously or each may be suspended on balancing mechanism in the conventional manner and moved into engagement with the work by the operator when performing each operation.

Accordingly, the main objects of the invention are: to provide a compact pressure applying device having the operating arms located remotely from the force applying element; to provide a pressure applying device having a pair of rockable jaws mounted within a yoke and operated by a cylinder and piston mounted at one end of the jaws for producing working pressure at the opposite end thereof; to provide a pair of rockable jaws having work-performing arms at one end and arms on the opposite end to which a piston and cylinder are connected for applying a pressure thereto; to mount a pair of rockable jaws in a yoke in such manner as to control the movement of the jaws when pressure is applied thereto so that each moves a like amount relative to and from each other; to provide a compact pressure applying device which may be mounted upon a fixture or which may be supported on a cable to be manipulated by the operator when performing a welding, riveting, or similar operation upon workpieces; to provide a pressure plate between the movable jaws of the device which urges the workpieces together when being operated upon; and in general to provide a force applying tool which is simple in construction, positive of operation, and economical of manufacture.

Other objects and features of novelty of the invention will be specifically pointed out or will become apparent when referring, for a better understanding of the invention, to the following description taken in conjunction with the accompanying drawings, wherein Figure 1 is a sectional view of a force applying tool embodying features of this invention;

Fig. 2 is a broken sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is a plan view of the structure illustrated in Fig. 1;

Fig. 6 is a view of the structure illustrated in Fig. 5, when supported for manual manipulation;

Fig. 7 is a side view of the structure illustrated in Fig. 6;

Figure 8:
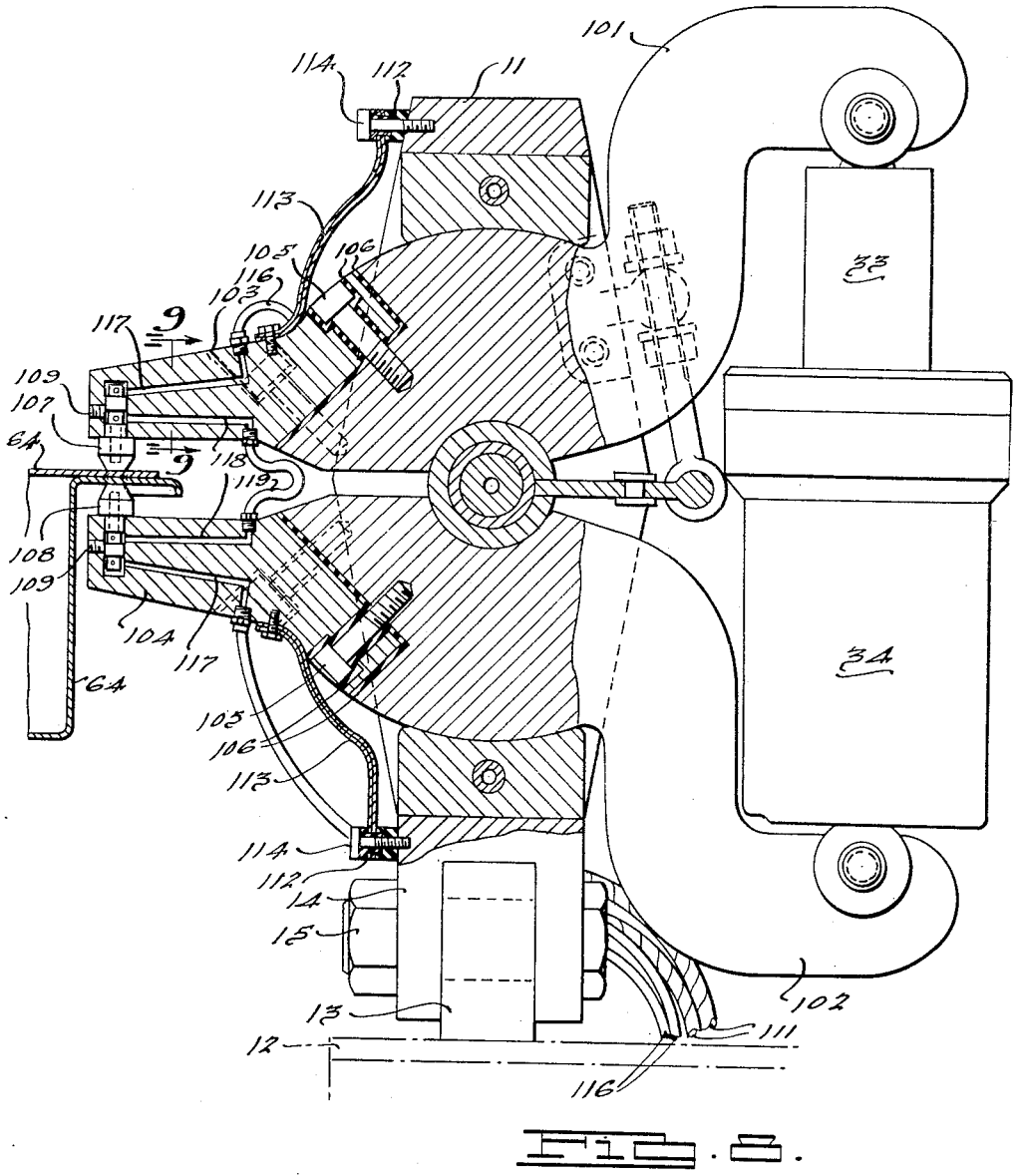
Fig. 8 is a view of structure, similar to that illustrated in Fig. 1, showing a modified form of the invention.

Referring to Figs. 1 to 5, a force applying tool is illustrated in the form of a riveting gun which embodies a supporting yoke 11 which is herein illustrated as mounted upon a base 12 of a fixture through the connection of a boss 13 thereof with a bifurcated end portion 14 of the yoke by a bolt 15. A central shaft 16 extends through the yoke on which a tubular element 17 is mounted. A central washer 18 is mounted upon the tubular element 17 on the ends of which a pair of end washers 19 and 21 is secured. A pair of jaws 22 and 23 has a central slot 24 which engages the central washer 18 when mounted upon the tubular element 17. Recesses 25 are provided on each side of the jaws for the reception of the washers 19 and 21.

The outer surfaces 26 of the jaws diametrically opposite to the tubular element 17 are of arcuate shape struck on a radius from the center of the shaft 16. A pair of bearing blocks 27 is mounted on the ends of the yoke on bolts 28 having arcuate surfaces 29 which mate with the arcuate surfaces 26 of the jaws. The main pressure exerted by the jaws reacts through the area of engagement of the arcuate surfaces 26 and 29 of the jaws 22 and 23 and the bearing blocks 27. This area of engagement is substantial and prevents the scoring of the metal of the engaging surfaces and produces a work applying force to the arms 31 and 32 of the jaws 22 and 23, respectively, when a piston 33 and cylinder 34 are in extended position.

The piston is connected to an arm 35 of the jaw 22 in a direction opposite to that of the arm 31. A similar arm 36 extends from the jaw 23, opposite to the arm 32, to which the end of the cylinder 34 is secured. The arms 35 and 36 are provided with a semicylindrical aperture 37 for receiving the transversely disposed cylindrical heads 38 provided on the remote ends of the piston and cylinder. The cylindrical heads 38 are retained against lateral movement by pins 39 which extend therethrough and which support washers 41 in recesses 42 in the arms 35 and 36 when spring rings 43 are snapped in grooves 44 near the ends of the pins. Oil holes 45 may be provided in the pins and through the cylindrical heads 38 for lubricating the surface of the head and apertures 37 in which the heads operate. The head 46 of the piston 33 is provided with grooves 47 in which elastic rings 48 are mounted for providing a seal between the inner wall of the cylinder and the exterior surface of the head 46. Similar elastic rings 48 are provided in the cylinder head 49 for sealing the rod portion of the piston 33 with the cylinder 34 for preventing the fluid in the cylinder from leaking. Fluid delivering conductors 51 and 52 are attached to opposite ends of the cylinder 34 communicating with passageways therein through which fluid is conducted to both sides of the piston head 46 for producing its movement within the cylinder 34. When fluid is delivered from the conductor 51 to the cylinder, the arms 31 and 32 of the device are moved to separated position. When the fluid is reversed and delivered from the conductor 52 to the cylinder and expelled therefrom through the conductor 51, the jaws are moved toward each other to perform a desired operation.

In the structure illustrated in Figs. 1 to 5, a pair of apertures 53 is provided near the ends of the arms 31 and 32 for receiving the shanks 54 of riveting dies 55 which are mounted in aligned relation. Suitable means, herein illustrated as set screws 56, secure the riveting dies in position within the apertures 53. Midway between the arms 31 and 32 a resilient pressure plate 57 is mounted having a hollow cylindrical head 58 through which the riveting die 55 of the jaw 32 extends. The opposite end of the plate 57 extends into a slot 59 on the inner surface of the end washers 19 and 21. Trunnions 61 project outwardly from the edges of the plate 57, into apertures 62 provided in the washers in alignment with the slots 59, and firmly support the plate on the washers. Each of the washers 19 and 21 has a nib 66 extending therefrom less than 180° from the slot 59. The recesses 25 in the jaws 22 and 23 which receive the washers 19 and 21 are further extended in both jaws to receive the nibs. In Fig. 1 the recesses 25 in the lower jaw 23 contain extensions 67 for receiving the nibs 66 on each of the washers 19 and 21. This rigidly retains the resilient force applying plate 57 anchored to the lower jaw 23 with the tubular end portion 58 extending above the riveting die 55 of the arm 32. This permits the tubular head 58 of the pressure applying plate 57 to first engage the sheets prior to the engagement of the riveting die 55 of the arm 32 with the rivet for forcing sheets 64 into intimate relation against the rivet head engaged by the die 55 of the arm 31. The further movement of the arms 31 and 32 toward each other produces the swaging of the end of the rivet against the sheets 64 and the head of the rivet 63.

For limiting the movement of the jaws 22 and 23 within the yoke 11, the central washer 18 has a lever arm 71 welded or otherwise secured thereto to project between the jaw portions adjacent to the cylinder 34. A pair of trunnions 72 extends from each side of the arm 71 beyond the side faces of the jaws 22 and 23 in position to be engaged by an eye 73 of a bolt 74. The bolt projects through a slot 75 in a circular head 76 projecting from a bracket 77 which is secured to the outer faces of the side members 68 of the yoke by suitable screws 78. Nuts 79 are provided on the bolt 74 on either side of the head 76 for adjusting the position of the arm 71 relative to the yoke 11.

A resilient bumper 81 may be provided in the arm 71 in position to be engaged by either one or both of the jaw portions 35 and 36 when the jaw portions 31 and 32 are in open position. The arm 71 and bolts 74 prevent the jaws 22 and 23 from rocking within the yoke 11 to one or the other extreme position so as to have the jaws extend substantially normal to the vertical axis of the yoke when in open and closed positions.

When the jaws are applied to a rivet 65, the movement to closed position will first cause the die 55 on the arm 31 and the spring pressure plate 57 attached to arm 31 to move into engagement with the head of the rivet 63 and the sheets 64, respectively, to force the head and sheets into intimate engagement with each other as the jaw 55 on the arm 32 continues to move to perform the swaging operation. When the jaw portions 31 and 32 open thereafter by the movement of the piston into the cylinder, they will both move away from each other due to the position of the arm 71, for as soon as one jaw is moved into contact with the bumper 81 on the arm, the other jaw must thereafter move. The movement continues until the piston has advanced completely into the cylinder, at which time the last-mentioned jaw moves into engagement with the bumper to thereby positively retain the jaws in position relative to the yoke.

The arm 31 may be extended upwardly, as illustrated in dot and dash line at 82, to be positioned some distance above the die 55 on arm 32 so that a riveting operation can be performed by an extending die 83 carried thereby on an element having a flange over which the die 83 will project. It will be noted from Fig. 3 that a lubricating passage 84 is provided in the shaft 16 communicating with annular grooves 85 in the shaft which communicate with the spaced apertures 86 in the wall of the tubular element 17. This provides lubrication to the areas of the jaws 22 and 23 which rock upon the outer surface of the tubular element 17. The shaft is provided with a head 87 on one end and with a thread on the other on which a nut 88 is screwed for retaining the shaft and the various elements in assembled position. Similarly, the bolts 28 for retaining the bearing elements 27 in position may be provided with a lubricating passageway 91 communicating with a passageway 92 in the bearing members for lubricating the surface of the bearing members and the surfaces 26 of the jaws 22 and 23. Nuts 93 are threaded on the end of the bolts 28 for retaining them in predetermined position on the yoke.

As pointed out hereinabove, the extension 67 of the recesses 25 is provided in the upper jaw 22 so that the pressure plate 57 may be reversed to have it operate in conjunction with the riveting die 55 on the arm 31 instead of the arm 32, as illustrated. It is to be further understood that through the adjustment of the nuts 79, the arm 71 may be positioned between the jaw portions 35 and 36 to cause each of the jaws 22 and 23 to move a like amount or disproportionate amounts, or to have one jaw disposed in fixed position with the other jaw being moved completely from open to closed position.

In Figs. 1 to 5 inclusive, the riveting device is illustrated as being mounted in a fixture upon the base 12 which may be rigidly anchored or which may be mounted on a slide and adjusted to or from the work when the latter is mounted in fixed position relative to the riveting element.

In Figs. 6 and 7 a further form of the device is illustrated, that wherein a yoke 94 is pivoted on the yoke 11 by the trunnions 95. The yoke is supported on a cable 96 which is preferably counterbalanced to relieve the operator from supporting the major portion of the weight of the device. A bail 97 may be attached to the yoke to assist the operator in manipulating the riveting device relative to a rivet to be swaged. The yoke may be provided with an arcuate portion 98 on which a clevis 99 on the end of the cable 96 may be shifted for the purpose of tilting the riveting device to have the jaws disposed at the angle at which the axis of the rivet is positioned. This further relieves the operator from manipulating the riveting device to have the axis of the riveting elements thereof aligned with the axis of the rivet.

Figure 9:
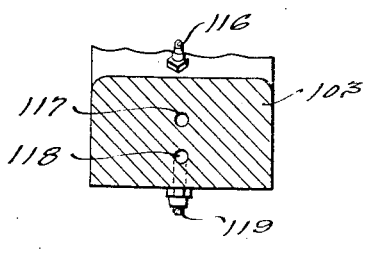
Fig. 9 is an enlarged sectional view of the structure illustrated in Fig. 8, taken on the line 9—9 thereof.

Referring to Figs. 8 and 9, a further form of device is illustrated, that wherein jaws 101 and 102 are provided with arms 103 and 104 of conducting material supported on the end of the jaws by screws 105. The screws and the jaws are surrounded by insulating material 106 to completely insulate the arms 103 and 104 from the jaws. Welding tips 107 and 108 are attached to the ends of the arms 103 and 104 and secured in position by screws 109. Electrical conductors 111 are secured in conducting relation to flexible shunts 113 by screws 114 which are insulated from the yoke 11 by the insulating elements 112. Current is conducted by the conductors 111 and shunts 113 to the arms 103 and 104 and to the welding tips 107 and 108 which are moved into engagement with the sheets 64 to be welded together.

Coolant conduits 116 are conductively joined to passageways 117 and 118 in the arms 103 and 104 which are conductively joined by the flexible conductor 119 between the arms. The fluid flows into the passageway 117 of the arm 103 about the welding tip 107 through the passageway 118, conduit 119, to the passageway 118 of the arm 104, to the welding tip 108, and into the passageway 117 of the arm 104, and out through a conduit 116. In this manner the welding tips 107 and 108 are maintained at a sufficiently low temperature to prevent the heat produced during the welding operation from harming the engaging surfaces of the welding tips. The arm 71 between the jaws 101 and 102 controls the relative movement of the jaws in the same manner as hereinabove described in regard to the riveting device of Figs. 1 to 7 inclusive. It is to be understood that the movement of the piston 33 within the cylinder 34 in like manner produces the opening and closing of the jaws and the application of current to the arms 103 and 104 when a predetermined pressure has been built up within the cylinder through the operation of a pressure actuated switch, valve or like device as employed in conventional practice.

What is claimed is:

1. In a force applying device, a hollow yoke having parallel extending sides and parallel ends, bearing means extending through the yoke sides medially of the ends, a pair of rockable arms disposed in said yoke on the opposite sides of said means in engagement therewith to rock thereon, the side of said arms opposite to that engaging the bearing means being of arcuate shape struck from the center of said means, a pair of bearing elements having arcuate faces which mate with the arcuate faces of the arms disposed in contact therewith and supported within the ends of the yoke, force applying means disposed between the ends of the arms on one side of the bearing means for moving the ends away from each other when moving the opposite ends of the arms toward each other with a predetermined pressure, a central washer mounted upon the bearing means and extending into recesses in the arms for retaining the arms in aligned relation, washers disposed on the end of the bearing means extending into recesses in the sides of the arms, a plate extending from said central washer and projecting between the ends of said arms to which the force applying means is attached, and means for adjustably anchoring said plate to said yoke for controlling the movement of said arms relative to each other and the yoke.

2. In a force applying device, a hollow yoke having parallel extending sides and parallel ends, bearing means extending through the yoke sides medially of the ends, a pair of rockable arms disposed in said yoke on opposite sides of said means in engagement therewith to rock thereon, the side of said arms opposite to that engaging the bearing means being of arcuate shape struck from the center of said means, a pair of bearing elements having arcuate faces which mate with the arcuate faces of the arms disposed in contact therewith and supported within the ends of the yoke, force applying means disposed between the ends of the arms on one side of the bearing means for moving the ends away from each other when moving the opposite ends of the arms toward each other with a predetermined pressure, a central washer mounted upon the bearing means and extending into recesses in the arms for retaining the arms in aligned relation, washers disposed on the end of the bearing means extending into recesses in the sides of the arms, a plate extending from said central washer and projecting between the ends of said arms to which the force applying means is attached, means for adjustably anchoring said plate to said yoke for controlling the movement of said arms relative to each other and the yoke, and bumper means on said plate engageable by said arms.

3. In a force applying device, a hollow yoke having parallel extending sides and parallel ends, bearing means extending through the yoke sides medially of the ends, a pair of rockable arms disposed in said yoke on opposite sides of said means in engagement therewith to rock thereon, the side of said arms opposite to that engaging the bearing means being of arcuate shape struck from the center of said means, a pair of bearing elements having arcuate faces which mate with the arcuate faces of the arms disposed in contact therewith and supported within the ends of the yoke, force applying means disposed between the ends of the arms on one side of the bearing means for moving the ends away from each other when moving the opposite ends of the arms toward each other with a predetermined pressure, a central washer mounted upon the bearing means and extending into recesses in the arms for retaining the arms in aligned relation, washers disposed on the end of the bearing means extending into recesses in the sides of the arms, and means extending from said central washer and disposed between the ends of said arms to which the force applying means is attached which is adjustably connected to the yoke for controlling the amount of movement of each of said arms when the force applying means is actuated.

4. In a force applying device, a hollow yoke having parallel extending sides and parallel ends, bearing means extending through the yoke sides medially of the ends, a pair of rockable arms disposed in said yoke on opposite sides of said means in engagement therewith to rock thereon, the side of said arms opposite to that engaging the bearing means being of arcuate shape struck from the center of said means, a pair of bearing elements having arcuate faces which mate with the arcuate faces of the arms disposed in contact therewith and supported within the ends of the yoke, force applying means disposed between the ends of the arms on one side of the bearing means for moving the ends away from each other when moving the opposite ends of the arms toward each other with a predetermined pressure, a pair of washers disposed in recessed faces at the side of said arms to be flush therewith, projections on said washers engaging recesses on one of said arms for anchoring the washers thereto so as to move therewith, and a pressure plate between said arms secured to said washers for applying a pressure to the workpieces before and during an operation thereon.

OTTO MUELLER.

REFERENCES CITED

The following references are of record in the file of this patent:

UNITED STATES PATENTS

| Number | Name | Date |
|---|---|---|
| 335,976 | Thomson | Feb. 9, 1886 |
| 561,606 | Pratt | June 9, 1896 |
| 593,064 | Albree | Nov. 2, 1897 |
| 1,805,282 | Hammerstrom | Mar. 12, 1931 |
| 2,341,133 | Weightman | Feb. 8, 1944 |
| 2,341,458 | Martin | Feb. 8, 1944 |
| 2,369,294 | Harris | Feb. 13, 1945 |

FOREIGN PATENTS

| Number | Country | Date |
|---|---|---|
| 1,371 | Great Britain | May 22, 1871 |
| 9,533 | Great Britain | July 23, 1886 |
| 17,520 | Great Britain | Sept. 14, 1894 |
| 357,846 | France | Jan. 16, 1906 |